(12) United States Patent  
Biskeborn et al.

(10) Patent No.: US 8,315,013 B2
(45) Date of Patent: Nov. 20, 2012

(54) MAGNETIC WRITE HEAD WITH FLUX DIVERTING STRUCTURE

(75) Inventors: Robert G. Biskeborn, San Jose, CA (US); Philipp Herget, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 254 days.

(21) Appl. No.: 12/776,747

(22) Filed: May 10, 2010

(65) Prior Publication Data

US 2011/0273796 A1 Nov. 10, 2011

(51) Int. Cl.
*G11B 5/265* (2006.01)
*G11B 5/10* (2006.01)

(52) U.S. Cl. .................. 360/119.01; 360/121
(58) Field of Classification Search .......... 360/121, 360/119.01, 123.12, 123.37, 123.58, 125.01, 360/125.27, 125.72, 128, 319
See application file for complete search history.

(56) References Cited

U.S. PATENT DOCUMENTS

| 3,591,733 | A |   | 7/1971 | Pflughaupt |
| 3,881,191 | A | * | 4/1975 | Potter et al. ................. 360/121 |
| 3,959,824 | A |   | 5/1976 | Ohi et al. |
| 4,008,493 | A |   | 2/1977 | Pizzuto |
| 4,072,994 | A |   | 2/1978 | Takashima |
| 4,369,476 | A |   | 1/1983 | Karsh |
| 4,672,493 | A | * | 6/1987 | Schewe .................. 360/125.15 |
| 4,736,122 | A | * | 4/1988 | Opie et al. ................. 307/419 |
| 4,945,439 | A |   | 7/1990 | Sato |
| 4,954,921 | A | * | 9/1990 | Bolt ............................ 360/121 |
| 4,962,437 | A |   | 10/1990 | Wilcox |
| 5,239,433 | A |   | 8/1993 | Watanabe |
| 5,450,264 | A | * | 9/1995 | Nishimura et al. ........... 360/121 |
| 5,461,528 | A |   | 10/1995 | Keel et al. |
| 5,583,726 | A | * | 12/1996 | Mizoshita et al. ........... 360/321 |
| 5,883,750 | A |   | 3/1999 | Maurice et al. |
| 5,949,624 | A | * | 9/1999 | Simmons et al. .......... 360/318.1 |
| 6,072,669 | A | * | 6/2000 | Indeck ....................... 360/121 |
| 6,650,510 | B2 | * | 11/2003 | Kim et al. .................... 360/319 |
| 6,798,615 | B1 | * | 9/2004 | Litvinov et al. .......... 360/125.17 |
| 6,995,950 | B2 |   | 2/2006 | Lairson et al. |
| 7,180,704 | B2 | * | 2/2007 | Mochizuki et al. ....... 360/123.12 |
| 7,289,295 | B2 |   | 10/2007 | Guan et al. |
| 7,379,276 | B2 | * | 5/2008 | Im et al. ...................... 360/319 |
| 7,876,531 | B2 | * | 1/2011 | Bozeman et al. ............. 360/136 |
| 8,054,580 | B2 | * | 11/2011 | Kimura et al. ............. 360/125.1 |
| 8,068,312 | B2 | * | 11/2011 | Jiang et al. ................ 360/125.3 |
| 2006/0245108 | A1 |   | 11/2006 | Hsu et al. |
| 2007/0146931 | A1 |   | 6/2007 | Baer et al. |

FOREIGN PATENT DOCUMENTS

JP 03290805 12/1991

* cited by examiner

*Primary Examiner* — Julie Anne Watko
(74) *Attorney, Agent, or Firm* — Lieberman & Brandsdorfer, LLC (57) ABSTRACT

A magnetic write head with a flux diverting structure for diverting stray flux received from an external source. The write head includes a yoke with two poles and a non-magnetic gap formed there between, and functions to write data to a magnetic storage medium. The flux diverting structure is proximate to the first pole and has a magnetic connection toward the back of the structure, and a non-magnetic separation toward the front of the structure. The flux diverting structure is comprised of a magnetic permeable material such that stray flux is diverted away from portions of the write head.

20 Claims, 6 Drawing Sheets

MAGNETIC WRITE HEAD WITH FLUX DIVERTING STRUCTURE

BACKGROUND OF THE INVENTION

1. Technical Field

The present invention relates to magnetic write heads for writing to magnetic storage media. More particularly, this invention relates to diverting stray flux from sources external to a magnetic write head.

2. Description of the Prior Art

Magnetic storage and magnetic recording are terms referring to the storage of data on a magnetic medium. In magnetic recording, magnetic patterns are recorded onto a magnetizable material to store the data. The information is accessed using one or more read/write heads. Magnetic storage devices, primarily hard disks and magnetic tape drives, are widely used to store digital information such as software, audio, and video data.

Recording heads for use with magnetic storage media typically include a writer and a reader that respectively record and detect magnetic domains in a medium in proximity to the head. A writer typically has a coil with one or more turns wrapped around a ferromagnetic yoke. Writers operate by passing an electric current through the coil, which produces a magnetic field in the yoke. This magnetic field bridges a non-magnetic gap in the ends of the yoke, also known as the pole tips and also extends partly into the storage medium. For a perpendicular writer, a soft magnetic under layer can be employed in the storage medium such that the write field extends between the pole tip and soft under layer. When the write field exceeds the coercivity of the medium, the medium becomes magnetized. When the write current is reversed as the head moves over the medium, a magnetic transition is created. These transitions form the bits of digital data that are detected with the read head.

When two or more writers are in proximity, the magnetic field generated by one writer may enter the yoke of the other writer. This may lead to writer-to-writer crosstalk which may degrade the quality of the patterns recorded by the magnetic writer. More specifically, crosstalk between two writers is primarily caused by flux that originates at one writer and couples into the yoke of another writer.

SUMMARY OF THE INVENTION

This invention comprises a write head and a flux diverting structure for reducing magnetic flux in some portions of the yoke received from an external source.

In one aspect of the invention, a magnetic write head is provided with a yoke having first and second poles. A magnetic connection is formed between the first and second poles at a first end of the poles. In addition, a non-magnetic gap is formed between the poles at a second end of the poles. A coil that is wrapped around the magnetic yoke is used to create a magnetic field in the non-magnetic gap positioned between the first and second poles in response to electrical current passing through the coil. A first magnetic structure is provided proximate to one of the poles of the yoke. This structure is configured to divert stray magnetic flux from an external magnetic source. In addition, a reluctance between a portion of the first magnetic structure proximate to the second magnetic connection and the yoke at a first end of the poles is lower than a magnetic reluctance through a non-magnetic separation between the first magnetic structure and the yoke proximate to the second end of the poles, and the reluctance of the non-magnetic separation region has a higher magnetic reluctance than the reluctance of the non-magnetic gap.

In another aspect of the invention, a multi-track recording head is provided with multiple proximate write transducers, each of the write transducers having at least one proximal flux diverting structure. The flux diverting structures function to reduce magnetic crosstalk between the transducers.

In yet another aspect of the invention, a tape drive system is provided with multiple write transducers that are adjacently mounted. The write transducers have one or more proximate flux diverting structures such that magnetic crosstalk is reduced and the degradation of the detected data is minimized.

Other features and advantages of this invention will become apparent from the following detailed description of the presently preferred embodiment of the invention, taken in conjunction with the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention unless otherwise explicitly indicated. Implications to the contrary are otherwise not to be made.

DETAILED DESCRIPTION

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

The present invention is illustrated and described using magnetic storage tape as an example. However, the invention is readily extended to other magnetic storage media, such as a magnetic hard disk drive. Tape drives differ from disk drives in the mechanisms that transport the media with respect to the write head, but both use analogous magnetic read and write devices, and so are encompassed by the teachings of the present invention.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

A magnetic write head is employed to record data to a proximate magnetic recording medium. It is recognized in the art that multiple write heads may be employed to simultaneously write data to separate tracks on the recording medium. There is a restriction on the size of the head itself and limited space available between adjacent write heads. It is known that stray flux can enter and alter the magnetic field of a write head. One or more magnetic structures are present on each write head and divert magnetic flux that is received from a magnetic source external to the magnetic write head. Diverting the stray flux mitigates degradation in the quality of the recorded pattern that arises from receipt of the stray flux by the write head.

In the following description of the embodiments, reference is made to the accompanying drawings that form a part hereof, and which shows by way of illustration the specific embodiment in which the invention may be practiced. It is to be understood that other embodiments may be utilized because structural changes may be made without departing form the scope of the present invention.

The components shown in the figures are not drawn to scale in order to better illustrate features of the invention. In a typical construction, multiple write heads are mounted in proximity and in a housing that enables the heads to simultaneously write data to multiple tracks of the same magnetic storage media.

Figure 1A:
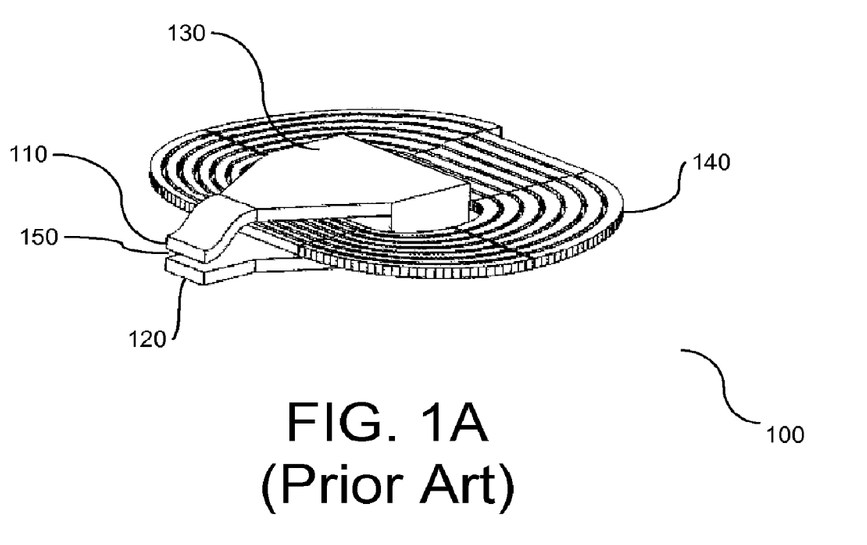
FIGS. 1A and 1B are prior art illustrations of a magnetic write head.
Figure 1B:
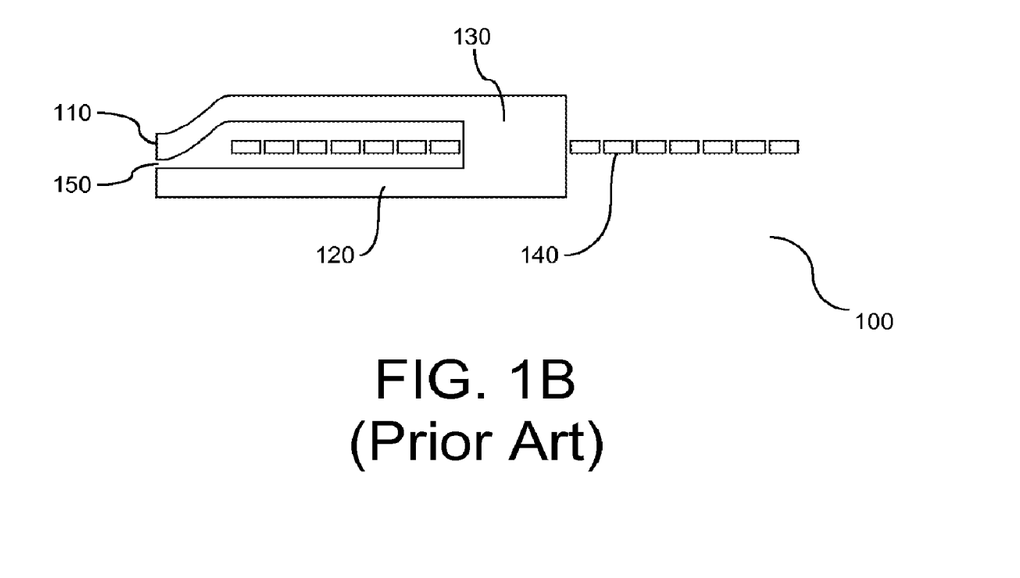

FIG. 1a shows a perspective drawing of a prior art magnetic write head and FIG. 1b shows a cross sectional view of the same head. As shown, the write head includes a yoke comprised of two poles (110) and (120) that are both magnetically connected at the back of the head (130). The two poles (110) and (120), as well as the back connection (130) are each comprised of ferromagnetic material, such as nickel, iron, and cobalt, alloys of Ni and Fe, CZT, or any other material known in the art. A coil (140) with a pancake configuration is shown surrounding the back connection (130). In one embodiment, the pancake configuration has a spiral shape. Application of an electrical current to the coil (140) creates a magnetic field. More specifically, magnetic field is guided along the two poles (110) and (120) and bridges the non-magnetic gap (150) between the poles. The magnetic field near the gap fringes into and writes to an adjacent magnetic storage medium (not shown)

Write heads such as those used in a hard disk and a tape drive, are typically fabricated using thin film processes on Alumina-Titanium Carbide (AlTiC) wafers, although other substrates and methods are known to those in the art. As part of the fabrication process, the front of the head structure is generally lapped to control the length of the poles and to form a surface over which the magnetic medium is placed. This surface is referred to as the recording surface, or lapped surface of the head.

It is well known to those in the art that magnetic flux created by a write head may extend beyond the direct vicinity of the write head into the surrounding materials. As noted above, write heads are typically arranged in a configuration wherein individual write heads are placed proximate to one another to satisfy specifications of a magnetic storage system. One embodiment of this invention is to use a structure to divert the stray flux away from some portion of the write head to counteract the effects caused by stray flux received from an adjacently mounted write head or other external magnetic source(s). The design of this flux diverting structure will depend on many factors. In general, one goal in designing the structure is to divert stray flux away from any area of the write head where stray flux will cause a degradation of the performance of the write head to an unacceptable level. Areas of particular concern are the front non-magnetic gap and portions of the poles exhibiting non-linear behavior during head operation. Factors that may be considered in the design of the flux diverting structure include the design of the write head itself, the materials in the writer, the amount of the desired reduction of stray flux, processing capabilities, cost, and spacing between write heads, etc.

Figure 2A:
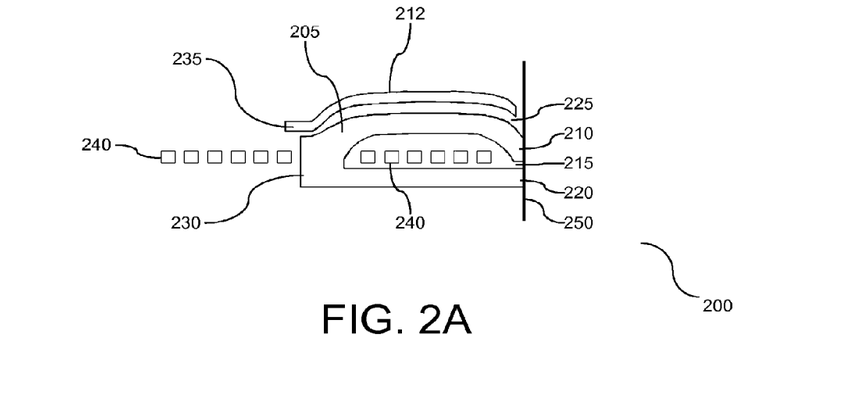
FIG. 2A, is a cross section of a magnetic write head having a structure to direct stray flux to the magnetic connection at the back of the write head, according to a preferred embodiment of this invention, and is suggested for printing on the first page of the issued patent.
Figure 2B:
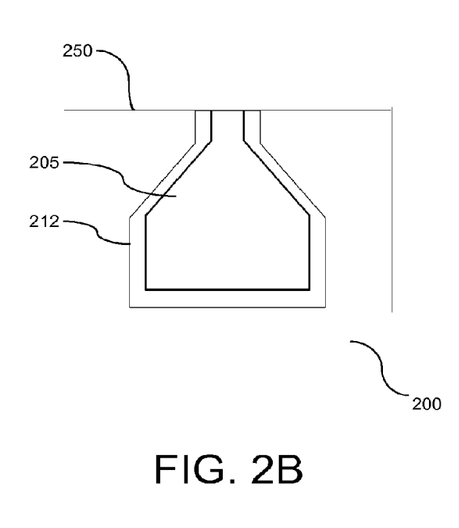
FIGS. 2B, and 2C are top views of two embodiments having the cross section of FIG. 2A.
Figure 2C:
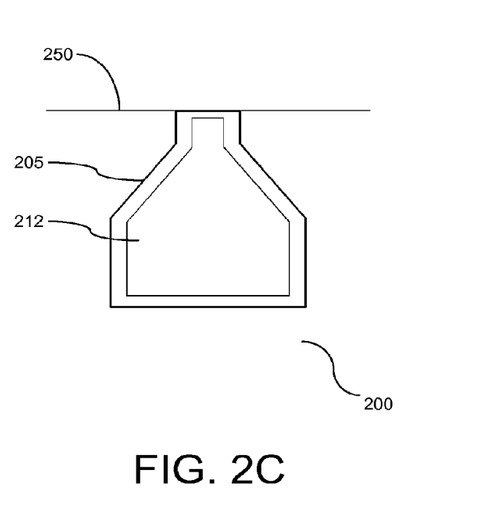

FIGS. 2A, 2B, and 2C illustrate two embodiments of the invention. FIG. 2A shows a cross sectional view of a write head (200), and FIG. 2B and FIG. 2C show top views of two embodiments having the same magnetic yoke cross sections as FIG. 2A. As shown in these figures, the write head includes a yoke (205) having first and second poles (210) and (220), respectively, that are both magnetically connected with a back connection (230). A non-magnetic gap (215) is formed between the first and second poles (210) and (220), respectively. The first and second poles (210) and (220), respectively, as well as the back connection (230) are comprised of a ferromagnetic material. A coil (240) is shown surrounding the back connection (230). When electrical current passes through the coil (240), a magnetic field is created and formed in the gap (215) that is positioned between the first and second poles (210) and (220), respectively. This magnetic field is used to write data to a magnetic recording medium that is placed near the recording surface (250) of the head.

A magnetic structure (212) is provided proximate to the yoke (205) to divert stray magnetic flux away from portions of the write head. To effectively divert flux, the structure (212) is comprised of a high permeability magnetic material, e.g. permalloy. Any such material can be use, as is known to those skilled in the art. Furthermore, the shape and position of the structure is designed such that it steers flux along the desired path. In the particular embodiment shown in the figure, the structure (212) is shaped such that it is closer to the back connection (230) than the other portions of the yoke. This causes flux to divert away from the top pole (210) and toward the back connection (230). This is only one example and any shape that meets the design requirements may be used, as would be known to someone skilled in the art.

In general, many different geometries of the flux diverting structure will serve the desired function, and the structure may be selected based on any number of other design criteria, such as cost, processing simplicity, head tape interface considerations, etc. FIGS. 2B and 2C show a top view of two different embodiments of the flux diverting structure that illustrate some of the possible variations. In FIG. 2B, the structure (212) is larger than the top yoke (205) of the head, and the structure (212) comes all the way up to the recording surface (250) of the head. In FIG. 2c, the structure (212) is smaller than the top yoke (205) and is not present at the recording surface (250) of the head.

Regardless of the size differences shown in FIGS. 2B and 2C, the reluctance between the structure (212) proximal to a second connection (235) and the yoke at a first end, i.e. adjacent to the back connection (230), of the first and second poles (210) and (220), respectively, is less than the reluctance between the structure in a region proximal to a non-magnetic separation (225) and the yoke at a second end of the first and second poles (210) and (220). In one embodiment, the non-magnetic separation is a layer comprised of an electrically conducting material. Similarly, in one embodiment, the second end of the first and second poles (210) and (220), respectively, is proximal to the recording surface (250). In yet another embodiment, and as reflected in FIG. 2A, the non-magnetic separation (225) has a higher magnetic reluctance than the reluctance of the non-magnetic gap (215).

Figure 3:
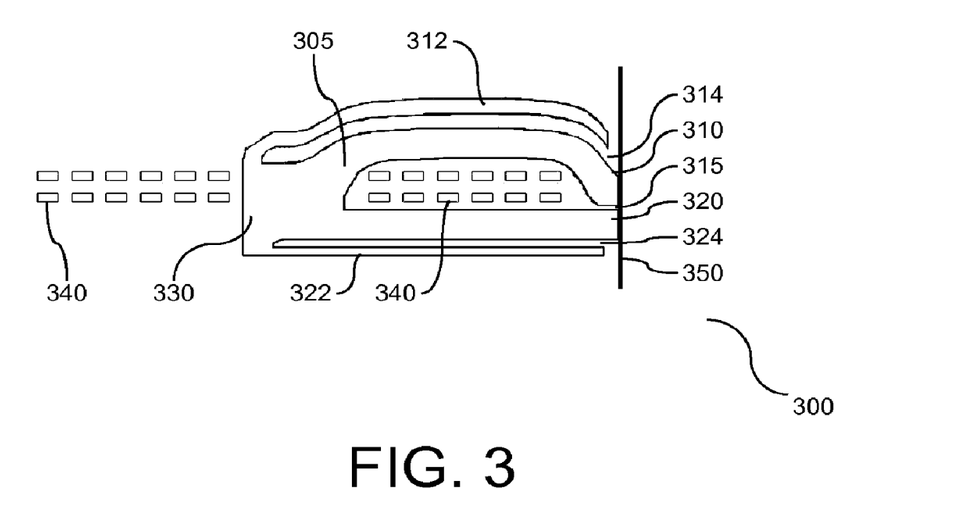
FIG. 3 is a cross section of the magnetic write head having two structures to direct stray flux to the back pole of the write head.

FIG. 3 shows a cross section of yet another embodiment of the invention. As shown in the figure, the write head (300) includes a yoke (305) having first and second poles (310) and (320), respectively, that are both magnetically connected with a back connection (330). A non-magnetic gap (315) is formed between the first and second poles (310) and (320), respectively. The first and second poles (310) and (320), respectively, as well as the back connection (330) are each comprised of a ferromagnetic material. A coil is (340) is shown surrounding the back connection (330). When electrical current passes through the coil (340), a magnetic field is created in the gap (315) that is positioned between the first and second poles (310) and (320), respectively. This magnetic field is used to write data to a magnetic recording medium that is placed near the recording surface (350) of the head.

FIG. 3 also shows two flux diverting structures that are located proximate to the head. In this embodiment, there is a top structure (312) proximate to the top pole (310) and a bottom structure (322) proximate to the bottom pole (320). The top structure (312) is magnetically separated from the top pole (310) by a first non-magnetic region (314), and the bottom structure (322) is separated from the bottom pole (320) by a second non magnetic region (324). The non-magnetic regions may be fabricated out of any material that that has a low magnetic permeability and functions to create a high magnetic reluctance between the structure and the pole. At the back of the head, the top and bottom structures are magnetically coupled to the magnetic back connection (330). The two structures both provide low reluctance paths which function to divert stray flux away from the top (310) and bottom (320) poles.

In the figure, the structures shown do not extend to the recording surface (350) of the head. This design feature may improve the characteristics of the head tape interface, however it is not necessary for the structures to function properly. In another embodiment of this invention, one or more of these structures may extend to the recording surface of the head, or have any other length or shape. Some particular structure shapes may simplify the processing. In the embodiment shown, the shape of the top structure (312) is made conformal to the shape of the top pole (310), using a conformal non-magnetic region (314). Other configurations are also possible. For example, one configuration that may be of particular interest is a top structure with a planar profile, as shown in FIG. 4.

Figure 4:
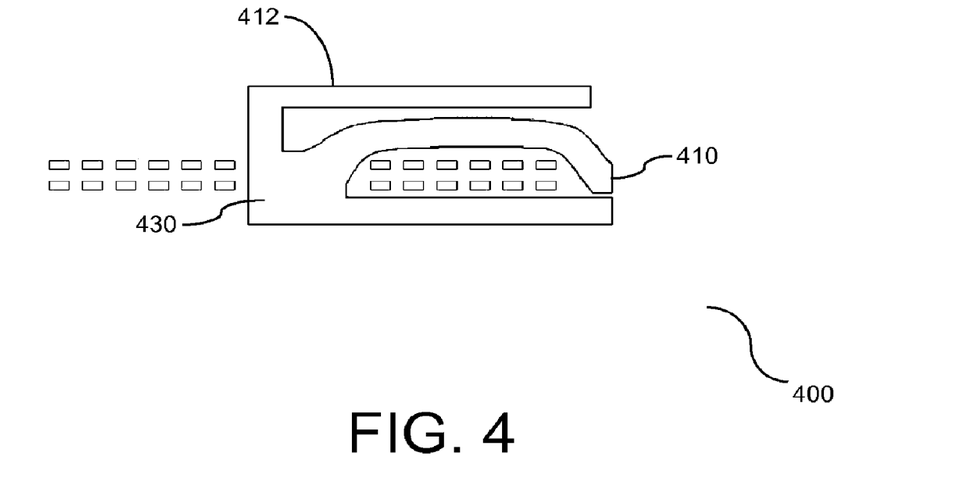
FIG. 4 is a cross section of the magnetic write head having an alternatively configured structure to direct stray flux to the back pole of the write head.

More specifically, FIG. 4 shows an embodiment in which the top structure (412) of the write head (400) is planar. In addition, as shown this embodiment has only one flux diverting structure (412). The flux diverting structure (412) is magnetically coupled to the magnetic back connection (430) of the head. This gives a structure having a lower magnetic reluctance in the back of the structure than in the front. Although only one flux diverting structure is shown in this embodiment, it may be necessary to use two structures to divert a sufficient amount of flux.

Figure 5:
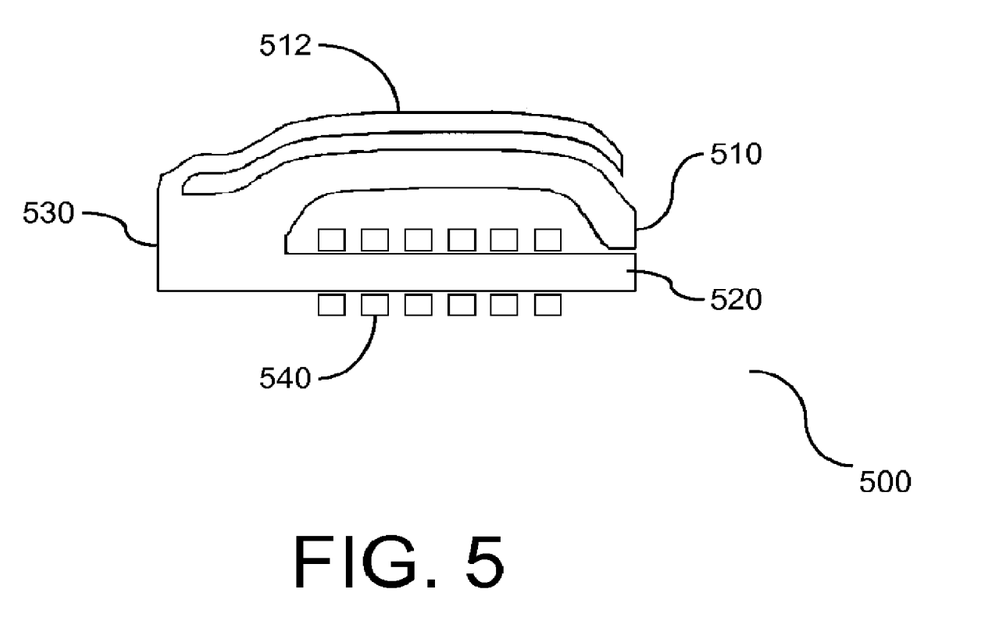
FIG. 5 is a cross section of the magnetic write head with an alternatively configured structure and an alternative coil configuration.

The embodiments shown in FIGS. 2A-C, 3, and 4 have a pancake coil configuration. In these configurations all of the coil turns pass around the magnetic connection in the back of the head structure and the turns lie in one or more planes. However, it is also possible to make heads with other coil configurations. FIG. 5 shows one embodiment of this invention in which the coil turns (540) of the write head (500) have a helical configuration and are wrapped around the bottom pole (520). In this embodiment, the flux diverting structure (512) is similar to the top structure (312) of FIG. 3. In general any of the embodiments presented can be combined with any configuration of coil turns that will enable the head to function properly.

Figure 6:
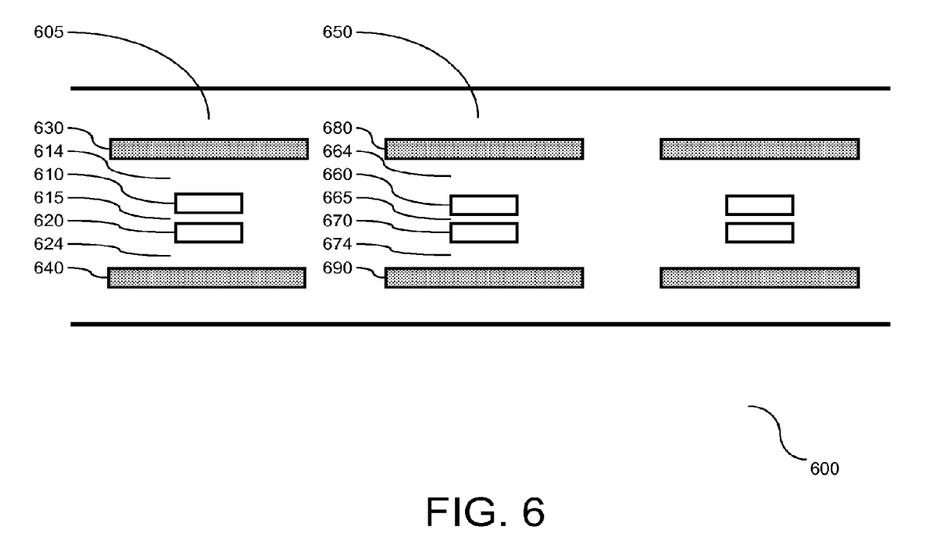
FIG. 6 is a diagram of a multi-track recording head with more than one write head, each head having a flux diverting structure proximate to each of its poles.

Although the descriptions in FIGS. 2A-C, 3, 4, and 5 pertain to an individual write head, a plurality of write heads may be arranged to write data to different portions of the magnetic storage medium. The spacing of the write heads is dictated by the desired recording format. For example, in one embodiment, 16 write heads write data to the magnetic storage medium with each write head assigned to a specific location on the surface of the magnetic storage medium. FIG. 6 is a diagram (600) of a multi-track recording head surface showing three write heads aligned in a linear arrangement. Each head is provided with a flux diverting structure adjacent to each of its poles.

The first write head (605) is shown with two poles (610) and (620) and a non-magnetic gap (615) formed between the two poles. Each of the two poles (610) and (620) are connected to a magnetic back connection (not shown). First and second flux diverting structures (630) and (640) are in proximity to each of the first and second poles (610) and (620), respectively. More specifically, a first flux diverting structure (630) is in proximity to the first pole (610), and a second flux diverting structure (640) is in proximity to the second pole (620). A first non-magnetic region (614) is positioned between the first pole (610) and the first flux diverting structure (630), and a second non-magnetic region (624) is positioned between the second pole (620) and the second flux diverting structure (640). Each non-magnetic region (614) and (624) functions in conjunction with its respective poles to divert stray flux away from portions of the write head.

The second write head (650) is shown with two poles (660) and (670) and a non-magnetic gap (665) formed between the two poles. Each of the two poles (660) and (670) are coupled to a magnetic back connection (not shown). First and second flux diverting structures (680) and (690) are in proximity to each of the first and second poles (660) and (670), respectively. More specifically, a first structure (680) is proximate to the first pole (660), and a second structure (690) is proximate to the second pole (670). A first non-magnetic region (664) is positioned between the first pole (660) and the first flux diverting structure (680), and a second non-magnetic region (674) is positioned between the second pole (670) and the second flux diverting structure (690). As in the first write head (605), each of the non-magnetic regions (664) and (674) of the second write head (650) functions in conjunction with its respective poles to divert stray flux away from portions of the write head (650).

Figure 7:
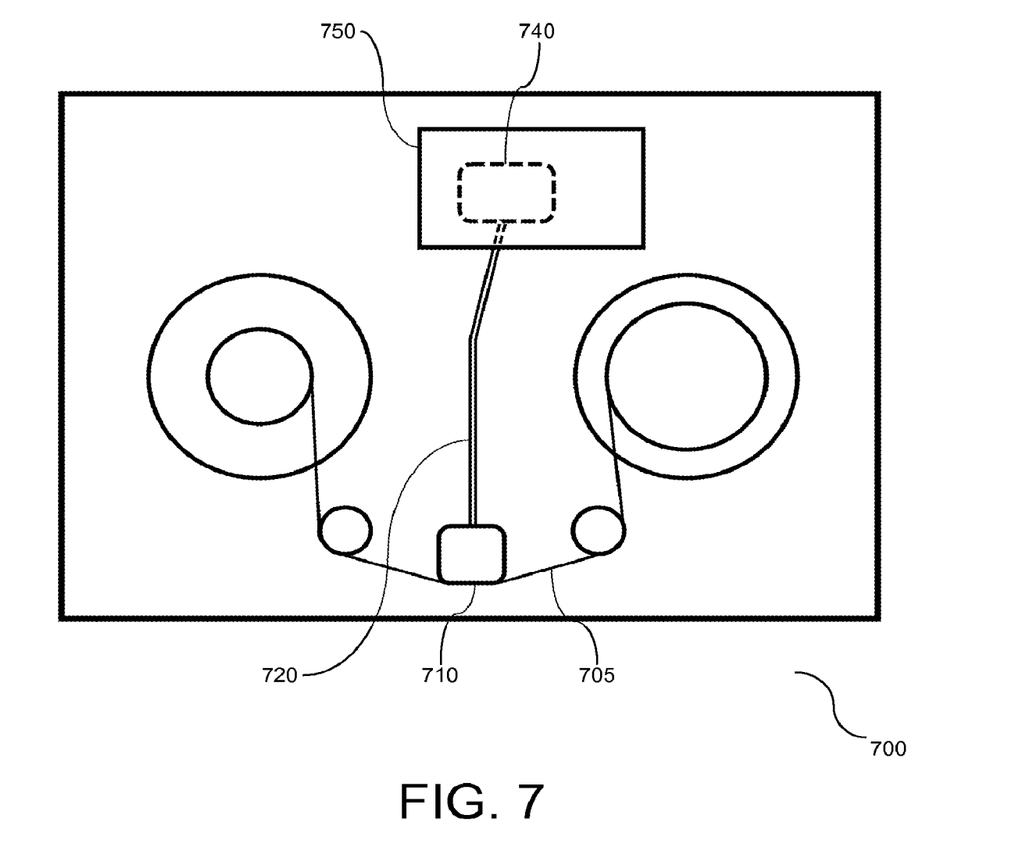
FIG. 7 is a diagram of a tape drive system with a magnetic storage medium and a head having an array of write transducers.

FIG. 7 is a block diagram of a tape drive system (700) having a plurality of adjacent write transducers to write data to a magnetic storage medium. In one embodiment, a center to center distance between any two adjacent write transducers is less than 166 micro meters. As shown, a magnetic storage medium (705) is transported past the recording head (710) containing a plurality of write transducers. The system also contains an electronic subsystem (750) which acts to control various components of the tape drive. A cable (720) connects the write head (710) to the read/write electronics (740) located within the electronic subsystem (750). The read/write electronics also contain the write drivers used to apply current to the writers. During operation, the write drivers deliver current to the write transducers, which simultaneously write data to the storage medium (705). As described above with respect to adjacent write transducers, each transducer is in receipt of stray flux from one or more adjacent write transducers. This flux may lead to an undesired crosstalk between the transducers. The crosstalk of one write transducer may be a byproduct of magnetic flux from an adjacent write transducer. As shown in the previous figures, these undesired effects can be reduced using flux diverting structures. In one embodiment, these structures may be employed on every write transducer in the tape drive system to divert stray flux around portions of the write transducer and reduce crosstalk. Similarly, in another embodiment, the structures may be employed on one or more select write transducers in the tape drive system. Regardless of the quantity of flux diverting structures employed, each structure diverts stray flux away from a portion of a magnetic write head, reducing the undesired effects of this flux.

We claim:

1. A magnetic head comprising:
    a yoke having a first pole, a second pole, and a first magnetic connection between the first and second poles at a first end of the poles, and a non-magnetic gap between the poles at a second end of the poles;
    a coil having one or more turns wrapped around the magnetic yoke; and
    a first magnetic structure proximate to the first pole of the yoke, wherein the structure diverts magnetic flux from an external magnetic source;
    said first magnetic structure having a second magnetic connection to the yoke at a first end of the poles, and a first non-magnetic separation from the yoke at the second end of the poles;
    wherein the reluctance between said first magnetic structure and the yoke proximate to the second magnetic connection is less than the reluctance between said structure and the yoke through the first non-magnetic separation from the yoke proximate to the second end of the poles; and
    wherein the reluctance proximate to the first non-magnetic separation is higher than the reluctance through the non-magnetic gap at the second end of the poles.

2. The magnetic head of claim 1, further comprising a second magnetic structure proximate to the second pole of the yoke; said second magnetic structure having a third magnetic connection to the yoke proximate to a first end of the poles, and a second non-magnetic separation at a second end of the poles; wherein the second magnetic structure diverts flux from an external magnetic source.

3. The magnetic head of claim 2, wherein the reluctance between said second magnetic structure and the yoke proximate to the third magnetic connection is less than the reluctance between said structure and the yoke through the second non-magnetic separation proximate to the second end of the poles; and wherein the reluctance proximate to the second non-magnetic separation is higher than the reluctance though the non-magnetic gap at the second end of the poles.

4. The magnetic head of claim 2, wherein at least one of the first and second magnetic structures divert stray flux to a direction selected from the group consisting of: past a portion of the head, away from the non-magnetic gap, and toward the magnetic connection between the first and second poles.

5. The magnetic head of claim 1, wherein the magnetic first structure is proximate to and conformal with at least a portion of the first pole.

6. The magnetic head of claim 1, wherein the first magnetic structure is proximate to the yoke and extends along at least a portion of the first pole.

7. The magnetic head of claim 1, wherein the first non-magnetic separation is a region comprised of an electrically conducting material.

8. The magnetic head of claim 1, wherein the first magnetic structure does not extend to a lapped surface of the head.

9. The magnetic head of claim 1, wherein the head is built using a thin film process.

10. The magnetic head of claim 9, wherein said coil is a spiral of at least two turns wrapped around the magnetic connection between the first and second poles.

11. The magnetic head of claim 9, wherein said coil is comprised of at least one turn wrapped around at least one of the poles.

12. The magnetic head of claim 1, further comprising two or more write heads mounted adjacent to each other.

13. A recording head comprised of multiple write transducers, each of said write transducers comprised of:
    a yoke have a first pole, a second pole, and a magnetic connection between the first and second poles at a first end of the poles, and a non-magnetic gap between the poles at a second end of the poles;
    a coil having one or more turns wrapped around the magnetic yoke; and
    a first magnetic structure proximate to one of the poles of the yoke, wherein the structure diverts stray magnetic flux from an external magnetic source; and
    said first magnetic structure having a second magnetic connection to the yoke at a first end of the poles, and a first non-magnetic separation from the yoke at the second end of the poles;
    wherein the reluctance between said first magnetic structure and the yoke proximate to the second magnetic connection is less than the reluctance between said structure and the yoke through the first non-magnetic separation proximate to the second end of the poles and wherein the reluctance proximate to the first non-magnetic separation is higher than the reluctance through the non-magnetic gap at the second end of the poles.

14. The recording head of claim 13, wherein the first magnetic structures divert stray flux generated by one or more of the other write transducers.

15. The recording head of claim 14, wherein the flux diverting structures act to reduce crosstalk between write transducers.

16. The recording head of claim 13, further comprising at least one of the write transducers having a second magnetic structure proximate to a different one of the poles of the yoke than the first magnetic structure; said second magnetic structure having a magnetic connection to the yoke proximate to a first end of the poles, and a second non-magnetic separation from the yoke at a second end of the poles; wherein the second magnetic structure diverts stray flux from an external magnetic source.

17. The magnetic head of claim 16, wherein within each head the reluctance between said second magnetic structure and the yoke proximate to said magnetic connection at a first end of the poles is less than the reluctance between said structure and the yoke through the second non-magnetic separation proximate to the second end of the poles and wherein the reluctance proximate to the second non-magnetic separation is higher than the reluctance though the non-magnetic gap at the second end of the poles.

18. A recording head of claim 13, wherein a center to center distance between any pair of adjacent write transducers is less than 166 micro meters.

19. A magnetic recording system having electronics for writing and reading, a transport for moving a magnetic medium over a recording head, and a recording head comprised of multiple write transducers, each of said write transducers comprised of:
  a yoke have a first pole, a second pole, and a magnetic connection between the first and second poles at a first end of the poles, and a non-magnetic gap between the poles at a second end of the poles;
  a coil having one or more turns wrapped around the magnetic yoke; and
  a first magnetic structure proximate to one of the poles of the yoke, wherein the structure diverts stray magnetic flux from an external magnetic source;
  said first magnetic structure having a second magnetic connection to the yoke at a first end of the poles, and a first non-magnetic separation from the yoke at the second end of the poles;
  wherein the reluctance between said first magnetic structure and the yoke proximate to the second magnetic connection is less than the reluctance between said structure and the yoke through the first non-magnetic separation from the yoke proximate to the second end of the poles and wherein the reluctance proximate to the first non-magnetic separation is higher than the reluctance through the non-magnetic gap at the second end of the poles.

20. The recording system of claim 19, further comprising at least one of the write transducers having a second magnetic structure proximate to a different one of the poles of the yoke than the first magnetic structure, wherein the second magnetic structure diverts stray flux from an external magnetic source, and further comprising said second magnetic structure having a lower magnetic reluctance at a second magnetic connection of the second structure to the yoke at the first end of the poles than the reluctance of a second non-magnetic separation of the second magnetic structure at the second end of the poles, and the second non-magnetic separation having a higher magnetic reluctance than the reluctance of the non-magnetic gap.

* * * * *